United States Patent

Reid, Jr. et al.

[11] 3,851,367
[45] Dec. 3, 1974

[54] MACHINE FOR INSTALLING PROBE ELEMENTS INTO LAMINATED FLOOR STRUCTURE

[75] Inventors: Walter L. Reid, Jr., Mattapoisett; C. Condit Peirce, Rochester; Raymond G. Pelletier, New Bedford, all of Mass.

[73] Assignee: Dole Electro-Systems, Incorporated, Palo Alto, Calif.

[22] Filed: June 15, 1973

[21] Appl. No.: 370,407

[52] U.S. Cl. ............................................. 29/203 R
[51] Int. Cl. ............................................. H05k 13/04
[58] Field of Search .......... 29/203 R, 208 C, 203 B, 29/208 R

[56] References Cited
UNITED STATES PATENTS
3,732,608  5/1973  Knopf .............................. 29/208 C
3,739,447  6/1973  Halliday ........................... 29/203 B

*Primary Examiner*—Thomas H. Eager
*Attorney, Agent, or Firm*—Owen, Wickersham & Erickson

[57] ABSTRACT

A machine is provided for forcing the probe elements of a receptacle or some other interconnecting device into the laminated electrical power and/or signal carrying structure of an area type distribution system comprised of a plurality of interconnected panel units. The machine retains a base unit of a receptacle device that supports the probe elements so that they are aligned with a reciprocating hammer member. A power driven mechanism supplies energy to reciprocate the hammer continuously and an electronic control system connected to the reciprocating mechanism provides an automatic cutoff of the driving energy when the probe elements have properly contacted internal conductive layers of the laminated floor structure. In one embodiment of the machine a sensing system may be incorporated with its control circuitry to detect spaces between panel units and prevent its operation until the receptacle to be installed is properly positioned. Prior to actuation of the hammer, the machine is manipulated in a scanning movement to verify the presence, by an attached sensor means, of the proper laminated floor structure beneath any covering on it to accommodate the installation of the probe elements.

28 Claims, 19 Drawing Figures

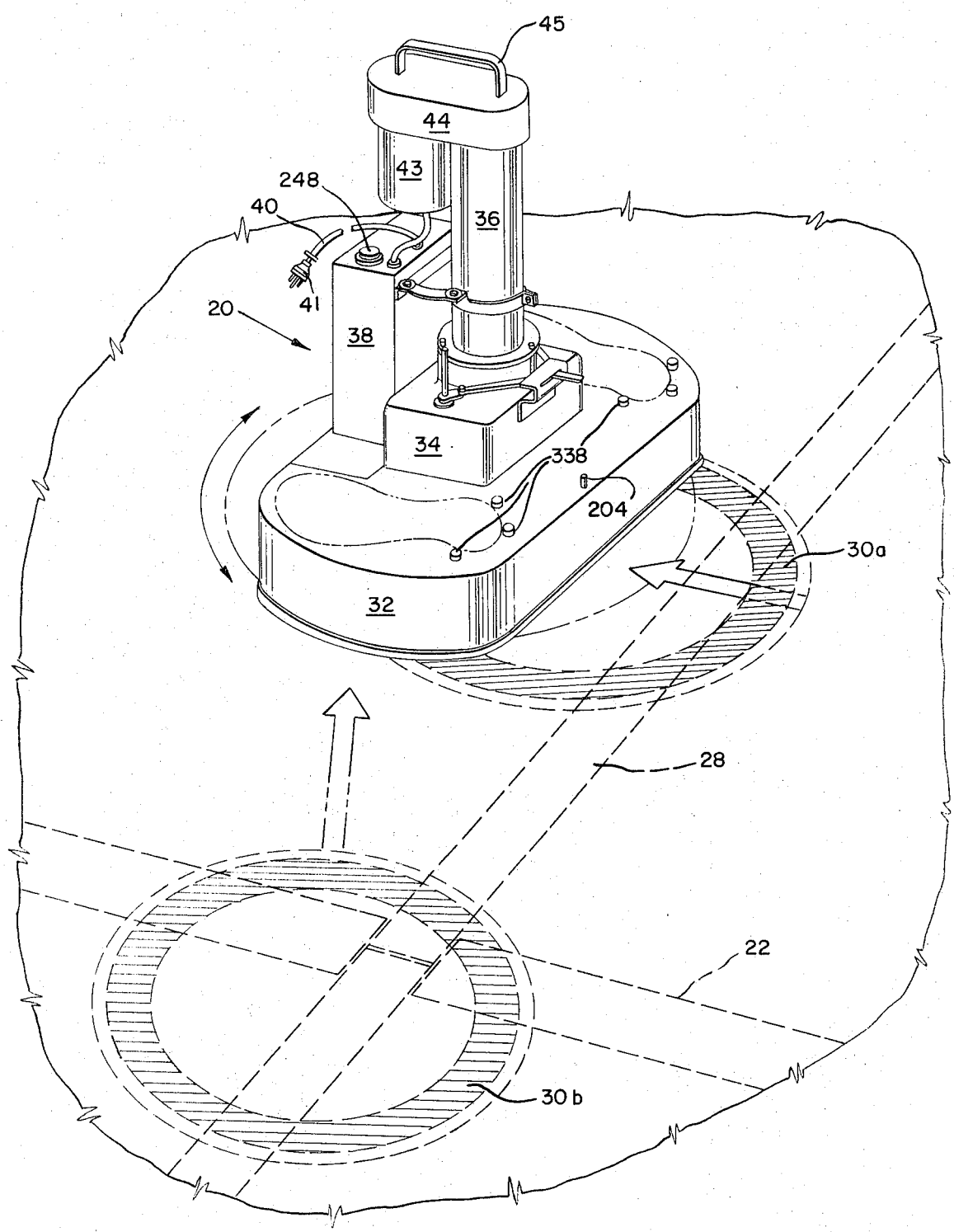
FIG_1

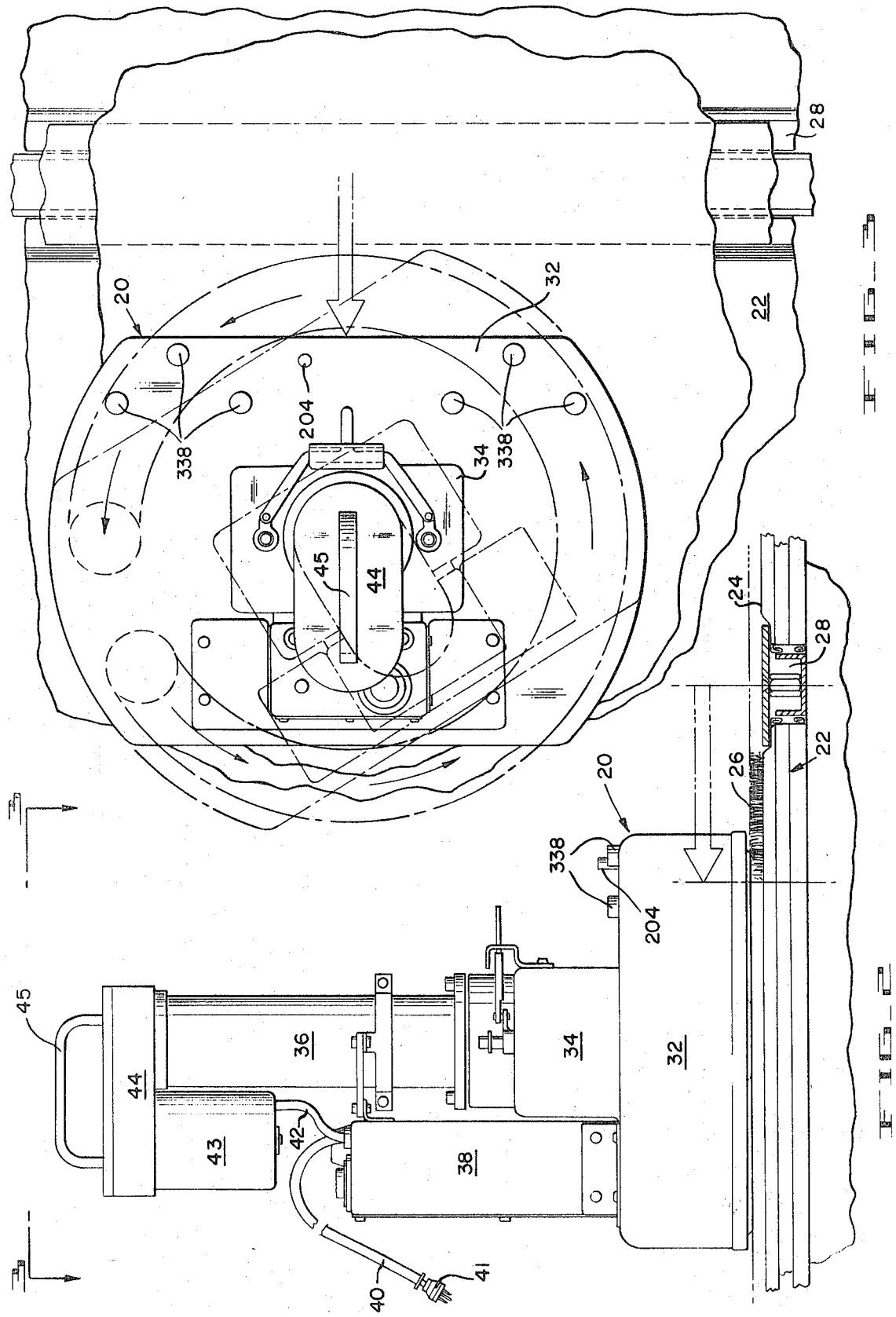

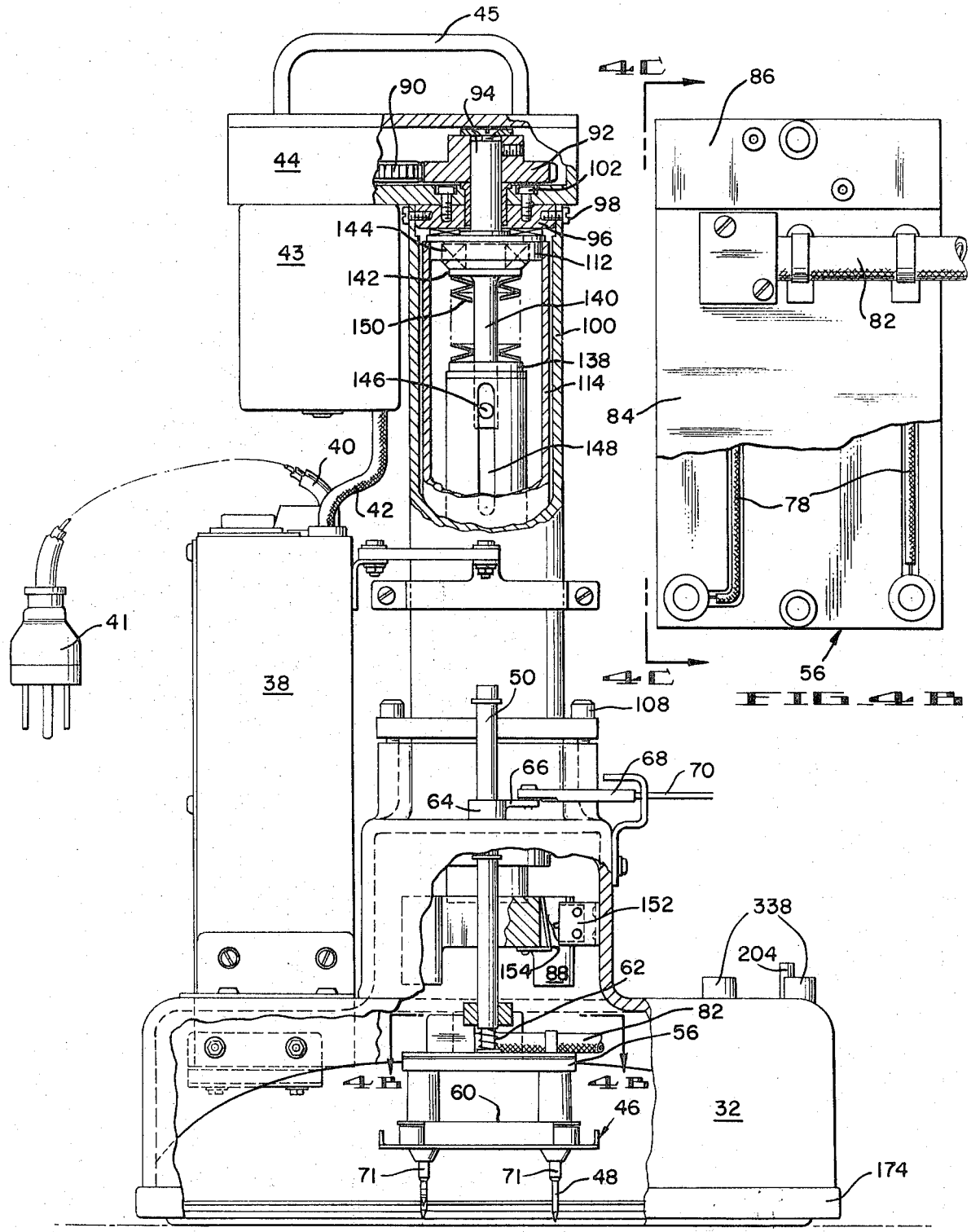

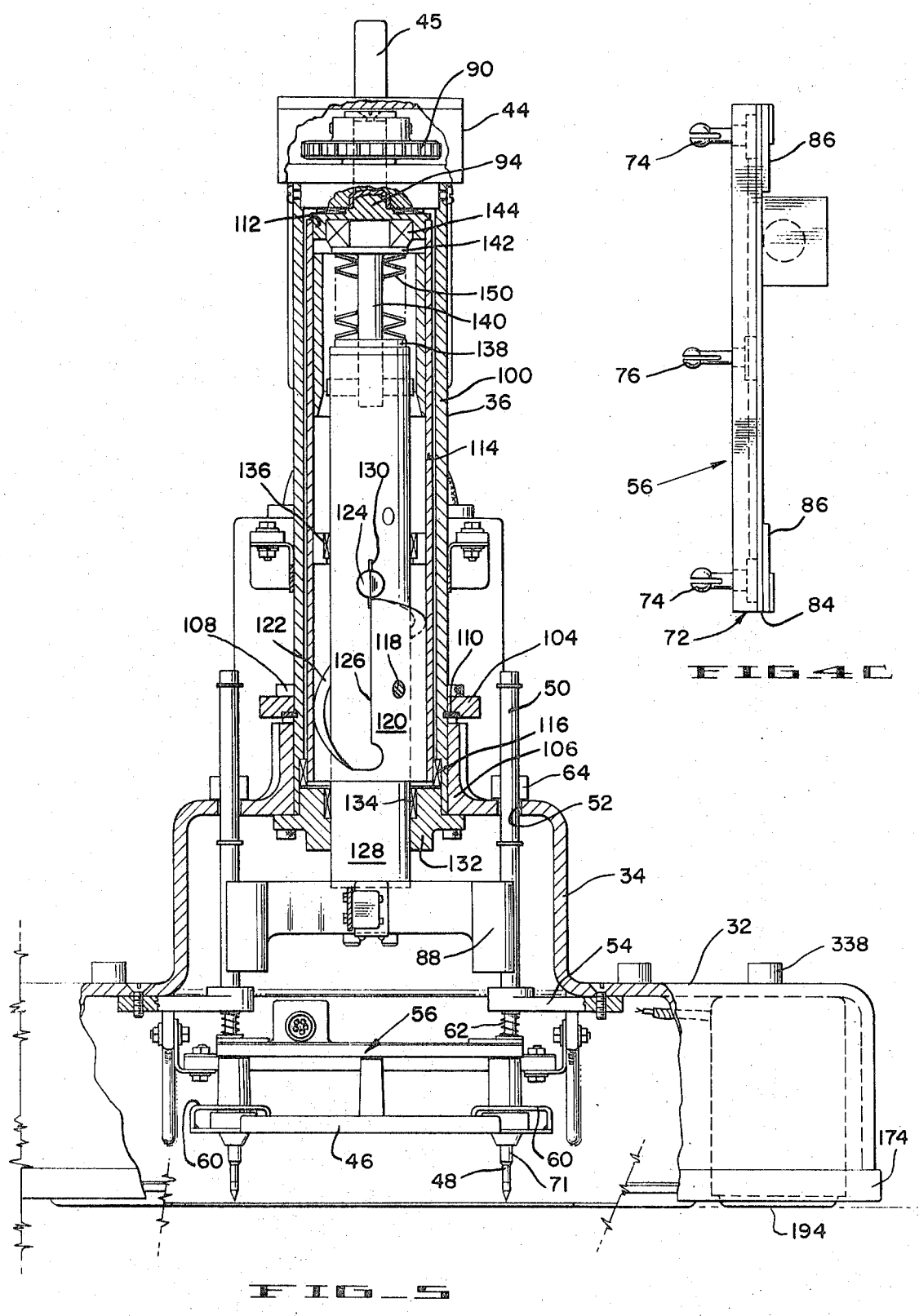

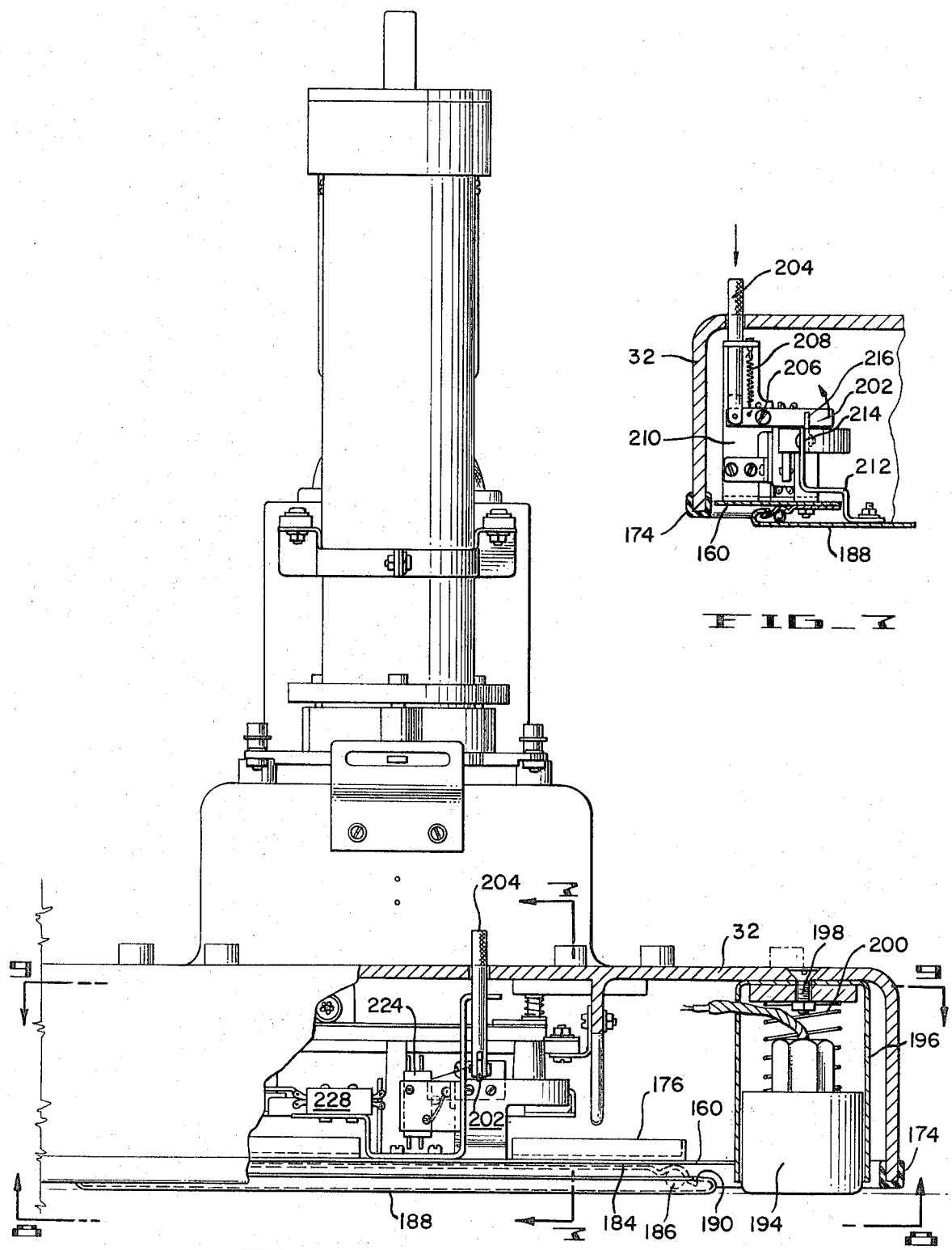

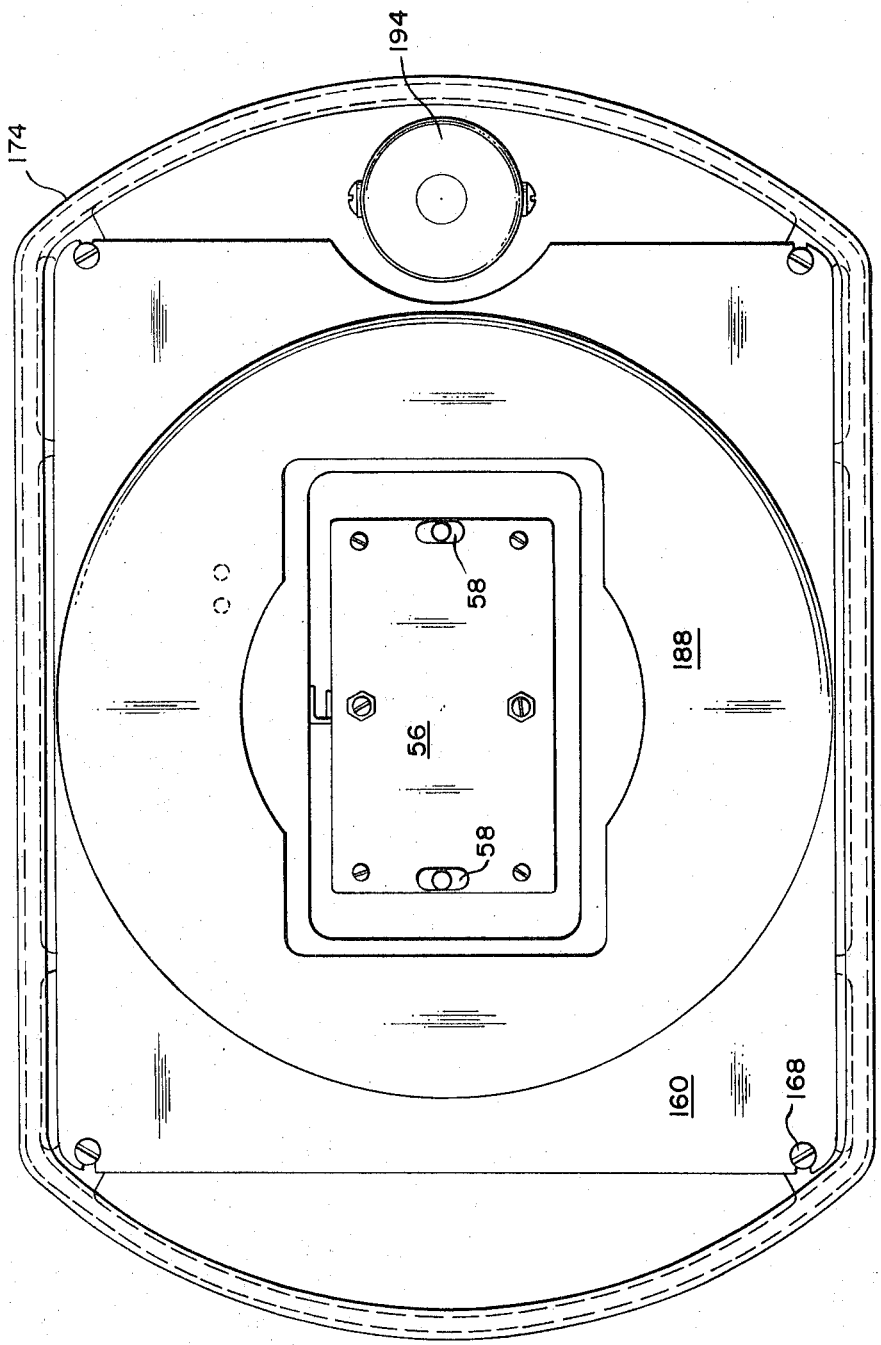

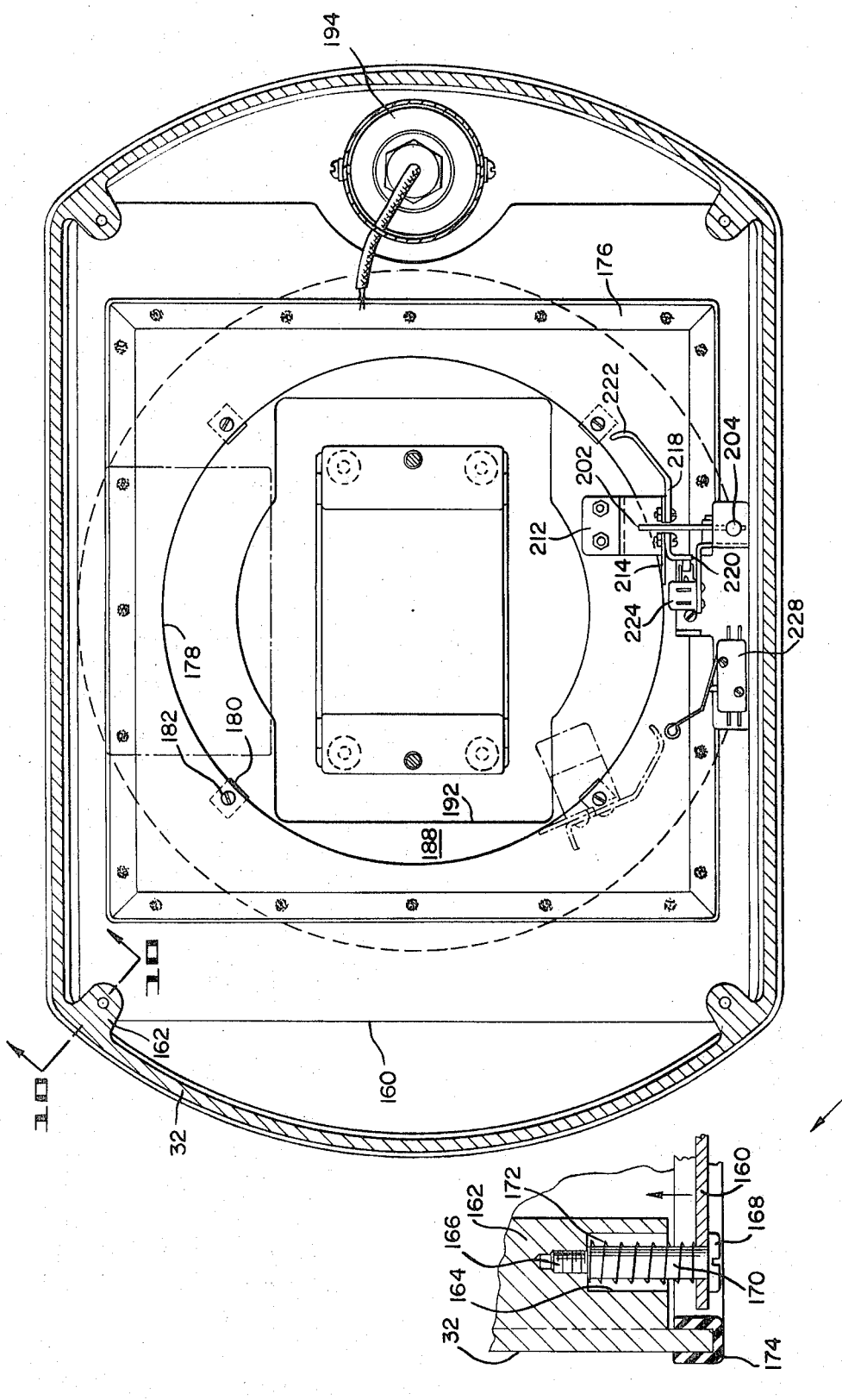

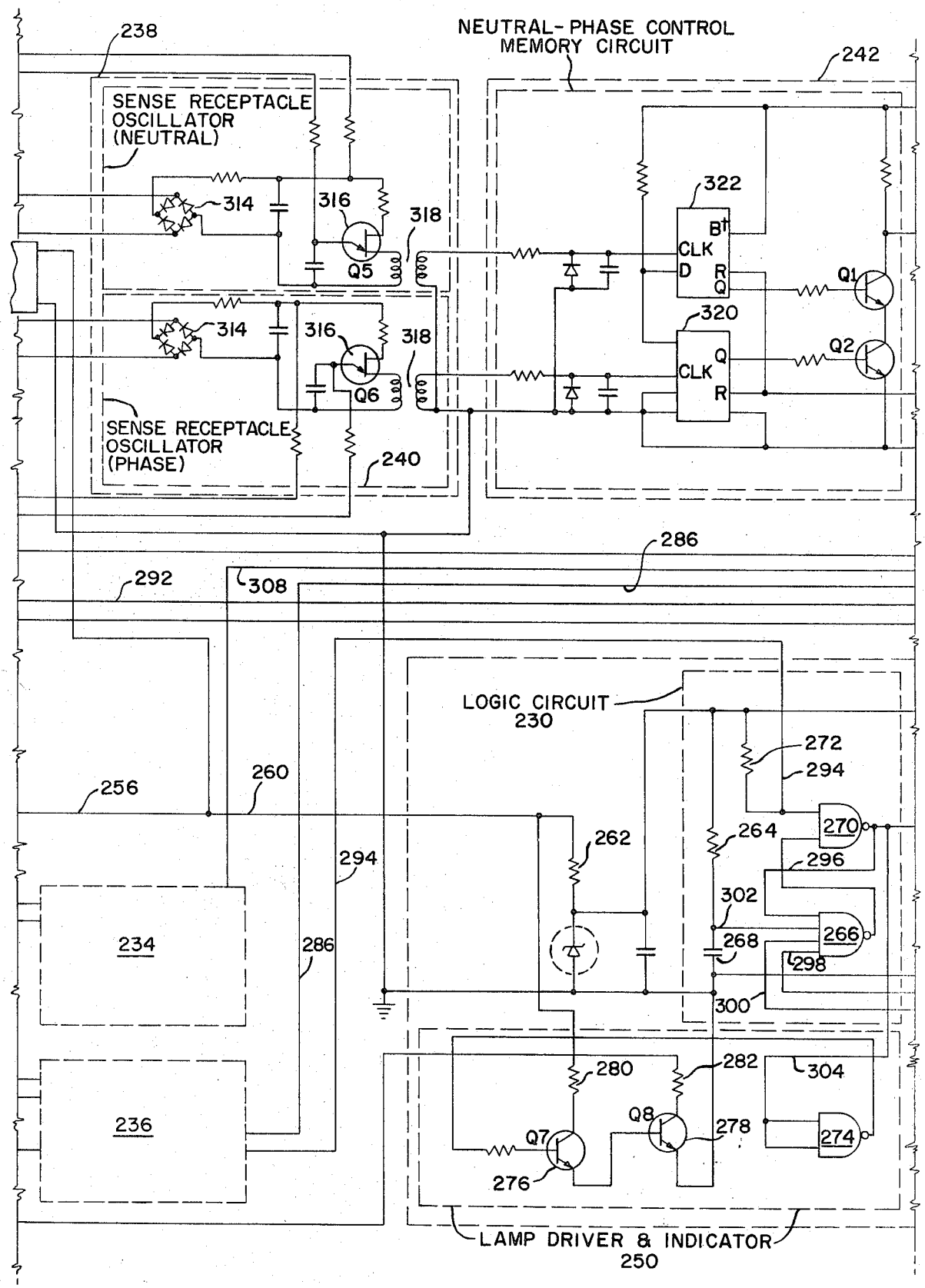
FIG_12B

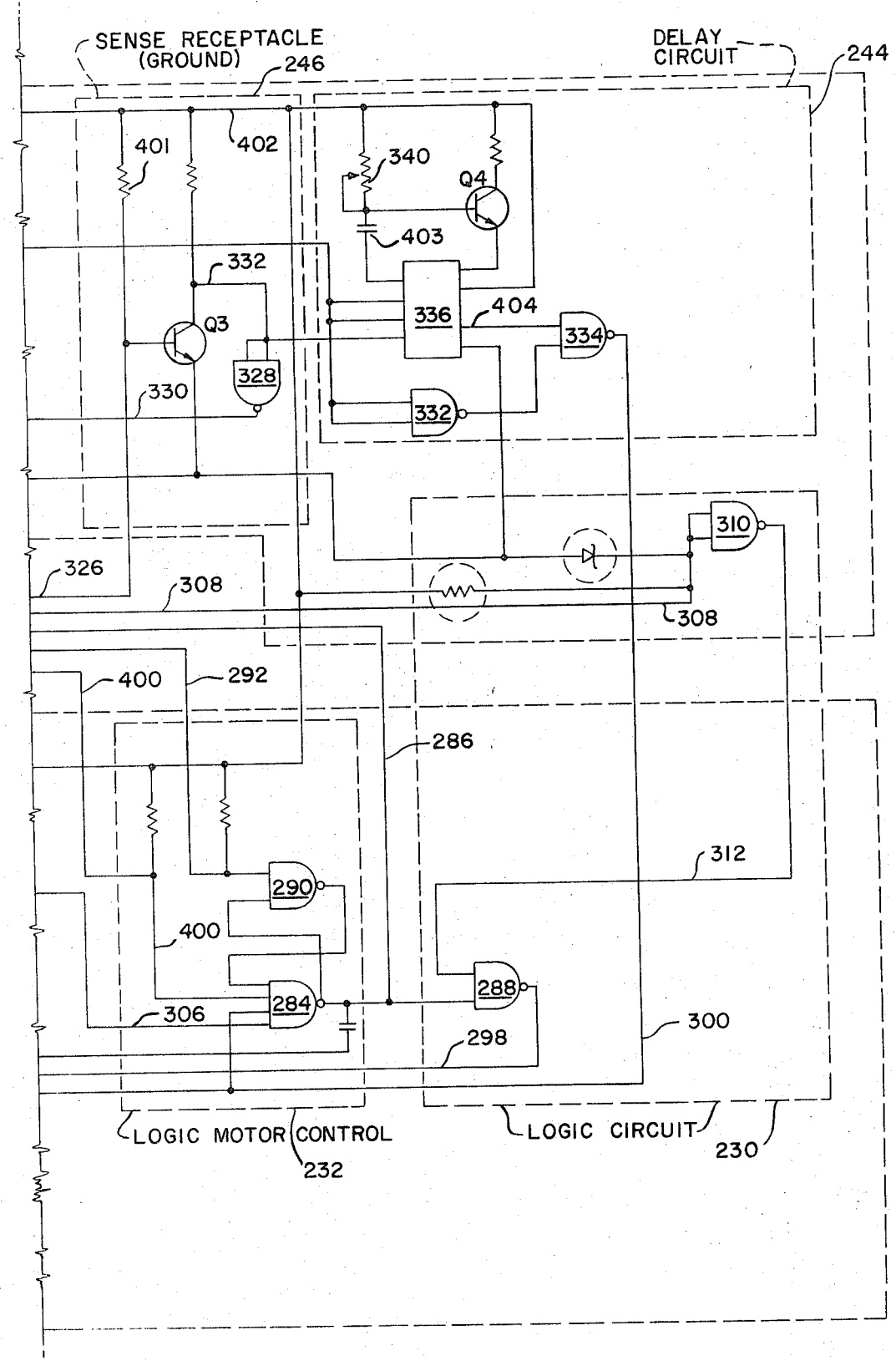
FIG_12C

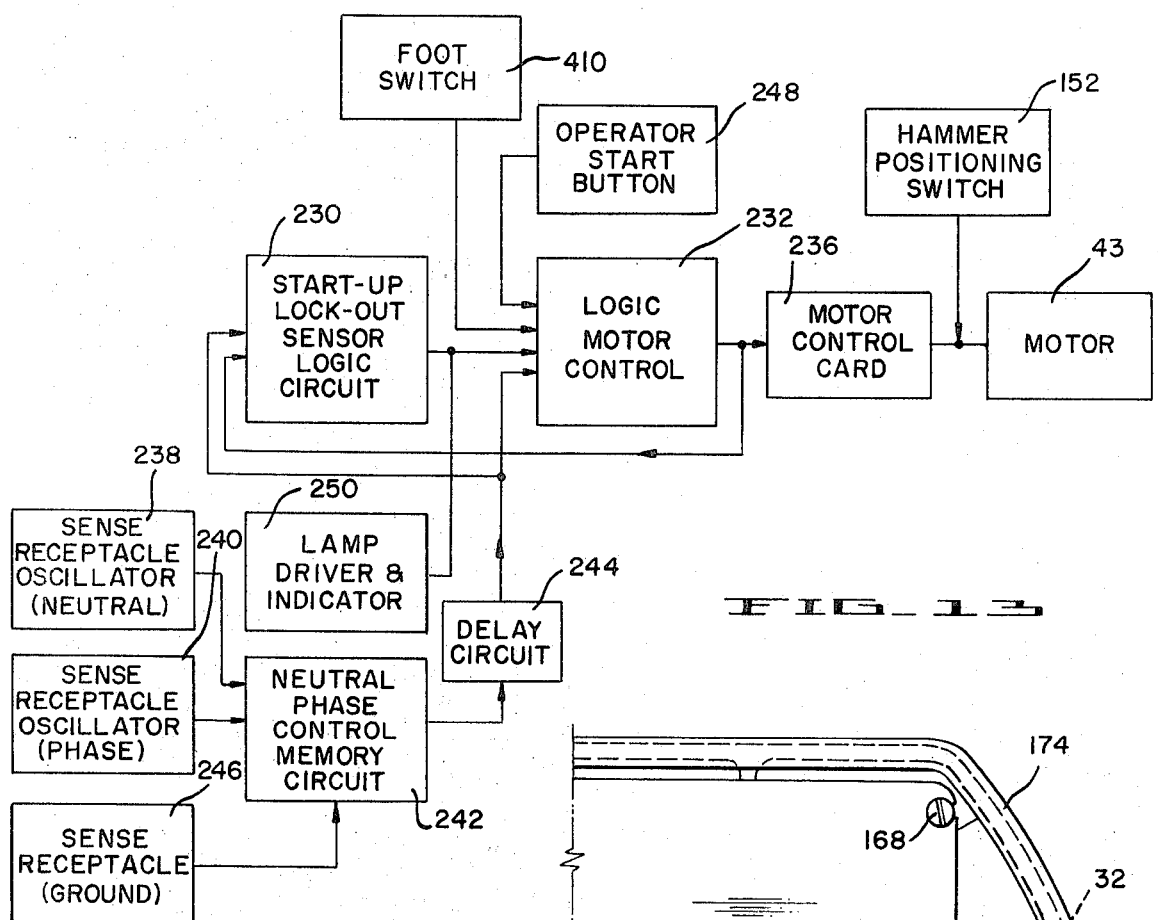
FIG_13
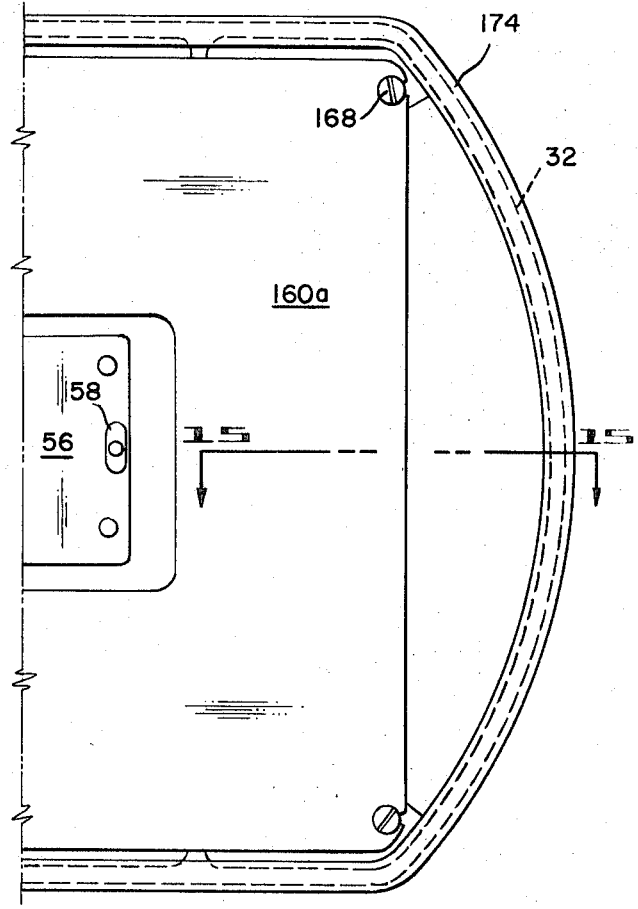
FIG_14
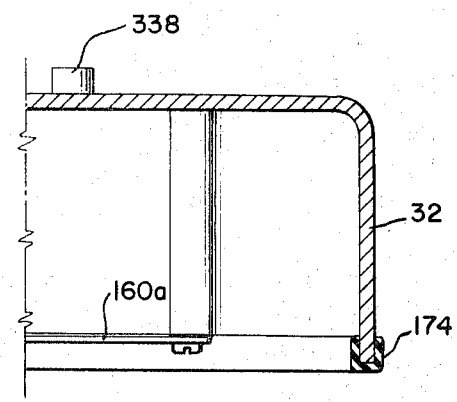
FIG_15

MACHINE FOR INSTALLING PROBE ELEMENTS INTO LAMINATED FLOOR STRUCTURE

BACKGROUND OF THE INVENTION

In U.S. Pat. No. 3,809,966, an area type power and signal distribution system is described comprised of a plurality of laminated panel units having conductive layers separated by dielectric layers. In a typical installation these panel units are installed in a side by side but slightly spaced apart arrangement on the basic floor structure of a building and with a conventional carpeting or floor covering over them. A basic advantage of such a distribution system is that a suitable receptacle device connectable to power or signal using equipment may be installed at any preselcted location on the area. The receptacle device such as described in U.S. Pat. No. 3,809,969 includes a base unit having a series of electrical probe elements that must penetrate the panel unit and make proper contact with its external and internal conductive layers. Since the panel units are in themselves fairly rigid and hard structural units, a substantial driving force must be provided to install the receptacle unit. Moreover, this driving force must be sufficiently adequate to initiate and maintain penetration of the probe elements into the laminated structure at a substantially uniform rate and then be cut off at the proper time when the elements reach the proper depth and make a good, durable contact with the conductive layers within the laminated structure. In addition, it was necessary to provide the required controllable driving force by a machine that is simple to operate by a relatively unskilled person so that installation of the probe elements can be made in a minimum of time with relative ease.

Another problem which arose during installation of the aforesaid receptacle devices in laminated panel units was in first determining the location of spaces between interconnected panels after they were covered by carpeting or tile in a typical multi-panel installation. Again, it was necessary to provide the installation machine operator with reliable but easily workable means for identifying such spaces before the driving force is initiated. The present invention solves all of these problems.

SUMMARY OF THE INVENTION

According to the invention, a machine for installing receptacle devices in a laminated structure of an area type distribution system comprises: a mounting means for retaining a base unit of a receptacle device; power means for actuating a reciprocating hammer to apply a continuous driving force to probe elements mounted on the base unit; and control means for cutting off the driving force when the probe elements have reached a predetermined depth within the laminated structure so as to be inproper contact with its internal conductive layers. The aforesaid mounting means, power means and a control means including a sensing means in one embodiment are all mounted on a chassis or housing of the machine. This housing has a main section that may be unlocked from and thereby rotatable relative to an attached lower base plate when the machine is not in its driving mode of operation. During rotation of the housing a sensor attached to it scans the area on which the machine is located to determine if the receptacle device is located in a position where it will not be driven into a space between panel units. The sensor provides signals to an electronic logic system that controls actuation of the power drive, and therefore the machine will not operate until the receptacle base unit is positioned over a single panel section. When this has been established and the driving mechanism has been energized, the driving force on the receptacle probe elements continues until they contact the internal conductive layers of the laminated floor structure. When this occurs, the control system of the machine automatically deenergizes the driving mechanism.

It is therefore a general object of the present invention to provide a machine for driving a plurality of receptacle probe elements into a laminated floor structure of an area type distribution system.

Another object of the invention is to provide a machine having adequate driving force for installing probe elements into relatively hard laminated structures at a relatively steady and rapid rate and moreover, one that will drive a plurality of probe elements along parallel paths that are perpendicular with respect to the surface of the laminated structure and into a good electrical contact with internal conductive layers of the structure.

Another object of the present invention is to provide a machine for driving probe elements of a receptacle base unit into a laminated floor structure having a support means to which the base unit may be quickly and easily attached.

Yet another object of the invention is to provide a machine that will scan an area under the machine prior to actuation of its driving force and prevent such actuation if laminated structure is not present within the entire area above which the probe elements are positioned.

Another object of the invention is to provide a machine that will automatically cut off the driving force when the probe elements of a receptacle base unit being installed reach their proper penetration depth within the laminated structure in contact with internal conductive layers therein.

Still another object of the invention is to provide a machine that is safe and easy to operate by unskilled persons; that is operable by conventional 115 VAC power and easily serviced and that is strong, durable and capable of troube-free operation.

Other objects, advantages and features of the present invention will become apparent from the following detailed description of one embodiment thereof, presented in accordance with 35 USC 112.

BRIEF DESCRIPTION OF THE DRAWING

FIG. 1 is a view in perspective showing a receptacle base installation machine as it appears in operation on a laminated floor structure;

FIG. 2 is a side view in elevation of an installation machine according to the present invention;

FIG. 3 is a top view of the machine shown in FIG. 2 with phantom lines showing a different rotational position during its scanning cycle;

FIG. 4A is an enlarged view in side elevation of our machine with portions broken away;

FIG. 4B is a plan view with portions broken away showing the contact board assembly for our machine;

FIG. 4C is a view in side elevation taken along line 4C—4C of FIG. 4B;

FIG. 5 is an enlarged fragmentary view in front elevation and in section of our machine;

FIG. 6 is another fragmentary view in front elevation showing further internal structural details;

FIG. 7 is a fragmentary view in section taken along 7—7 of FIG. 6;

FIG. 8 is a bottom view of our machine taken along line 8—8 of FIG. 6;

FIG. 9 is a view in section taken along line 9—9 of FIG. 6;

FIG. 10 is an enlarged fragmentary view in section taken along line 10—10 of FIG. 9;

FIGS. 12A, 12B and 12C together comprise a more detailed circuit diagram of the system of FIG. 11;

FIG. 13 is a block diagram of the control system for a modified form of our machine without the sensing feature;

FIG. 14 is a fragmentary bottom view of the modified form of machine according to our invention; and FIG. 15 is a view in section taken along line 15—15 of FIG. 14.

FIGS. 1 - 3 show a machine 20 embodying the principles of the present invention as it appears when in use for driving the probe elements of a receptacle device into a laminated floor structure 22. As previously described, the floor structure may be comprised of a series of laminated panel sections 24 which, once installed, are normally covered with carpeting 26, linoleum or some like form of floor covering. The adjacent panel sections in a typical floor installation are connected electrically but separated by duct-like passages 28. To avoid driving the probe elements into one of these passages, the machine 20 is equipped to perform a scanning-sensing procedure to assure its location directly above panel structure prior to actuation of its driving mechanism. The dotted annular patterns 30a and 30b in FIG. 1 indicate typical preliminary scanning-sensing tests which made it necessary to move the machine in the direction of the arrows to the position shown prior to commencement of the driving sequence.

Figure 11:
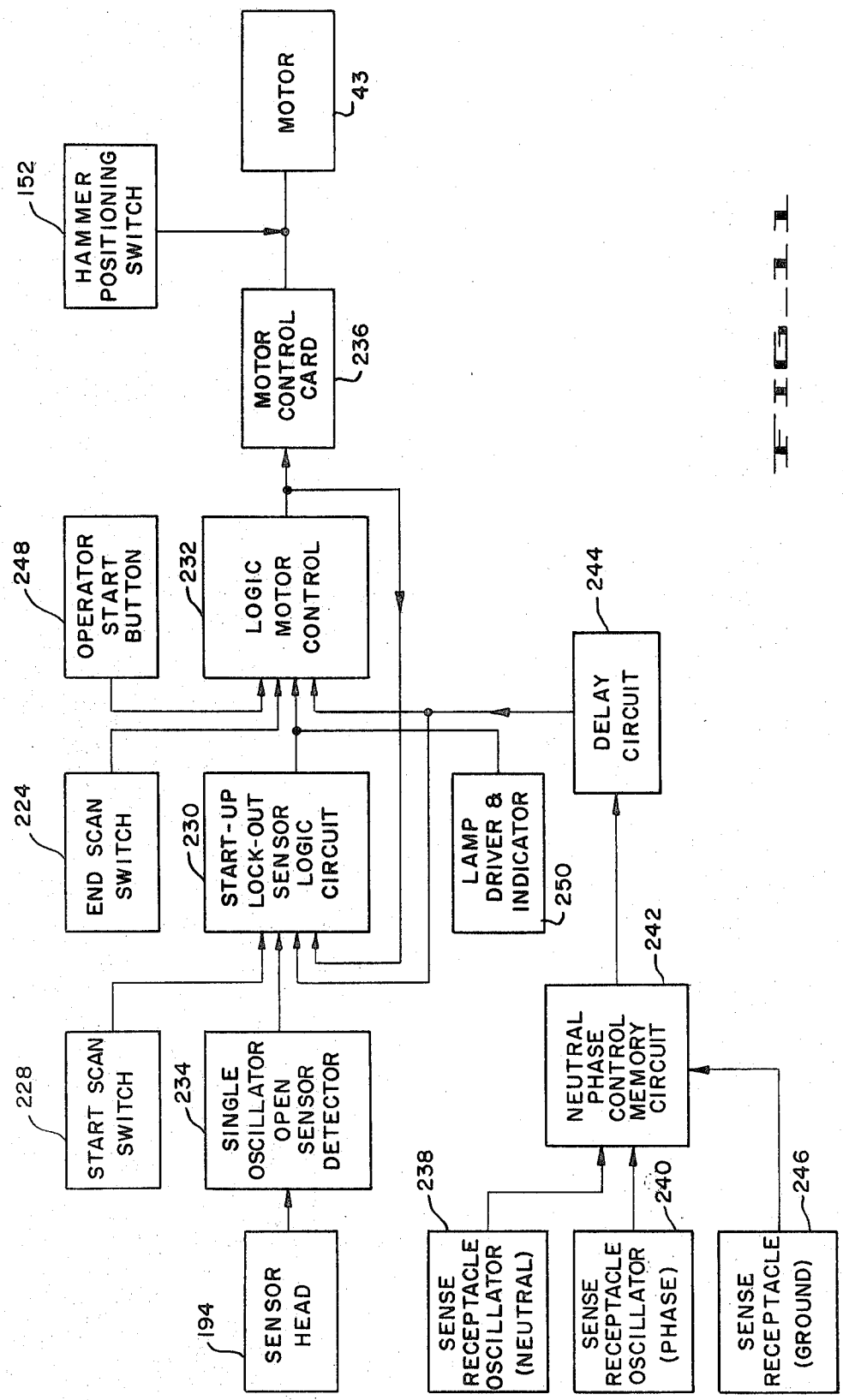
FIG. 11 is a block diagram of the sensing and control system for our machine.

Generally, the machine 20, as shown in the embodiment of FIGS. 1 and 2, comprises a lower housing 32 having a generally rectangular shape and an integral upper housing portion 34 that supports an upwardly extending drive support tube assembly 36. Spaced from the latter assembly and attached to the upper surface of the lower housing is an electrical power service and control box 38 containing the electronic circuitry for controlling the machine. Extending from the box 38 is a three wire cable 40 with a conventional plug 41 for a standard 115 VAC receptacle, and another cable 42 extends from the box 38 to an electric drive motor 43. The motor is attached to a gear box 44 that is also fixed to the top of the drive support tube assembly. A handle 45 is attached to the upper side of the gear box to facilitate easy lifting of the machine.

As described in the aforesaid U.S. Pat. No. 3,809,969 a receptacle device for an area type power and signal distribution system is generally comprised of a base unit 46 (as shown in FIG. 4A), which supports a plurality of probe elements 48. A housing unit (not shown) for this receptacle device contains an electronics package that is connected to the probe elements and its base unit 46 once the probe elements have been driven into a laminated panel unit and in proper contact with its internal and external conductive layers. Thus, the machine 20 has locking means for gripping and retaining a receptacle base unit in order to hold it in position before the driving force is applied. This locking means (FIGS. 4A and 5) comprises a pair of locking rods 50 that extend downwardly through holes 52 in the upper housing portion 34 located on opposite sides of the drive support tube 36 and also through a pair of aligned guide supports 54 attached to the inside of the lower housing. Below these guide supports these locking rods extend through openings in a base unit support and contact board 56 and at their lower ends both rods 50 have an enlarged, elongated foot portion 58 (See FIG. 8). Each foot portion is adapted to extend through a slot in an inverted channel member 60 provided at opposite ends of the receptacle base unit 46. When so extended through the slot and then turned about 90° each foot member becomes locked within its respective channel member. Coil springs 62 attached to rods 50 constantly force the base unit support board 56 downward against the base unit. Near their upper ends each rod extends through and is fixed to a bushing and retaining member 64 having a lever arm 66 that is pivotally connected to a locking bar 68 with a handle 70. Thus, with the foot member of each locking rod extended through a slot in the receptacle base unit, a mere lateral movement of the locking bar will cause rotation of the foot members 58 to lock the base unit in place against the plate 56.

The contact board 56 provides a means for maintaining an electrical connection between the probe elements on the receptacle base unit and the electronic control unit on the machine so that electrical continuity signals can be used to provide automatic cutoff of the driving power when the probe elements are in proper contact with the internal conductive layers of the laminated structure and ground bands 71 of the base unit are in contact with its external ground conductor. As shown in FIGS. 4A and 4C, the board 56 comprises a rectangular block 72 of dielectric material of substantially uniform thickness. Fixed near the four corners of this block are four connector pins 74 that extends downwardly from its bottom side and are adapted to connect with phase and neutral probe elements on a receptacle base unit. Spaced between the phase and neutral pins are a pair of ground pins 76. The upper ends of each of these connector pins is a terminal to which is connected a lead 78 that extends through a channel in the block 72 to a central location on it. At this location these six leads are bundled into a single flexible cable 82 which extends from inside the housing to the electronic control box 38. Bonded to the top of the block 72 is a relatively thin backing board 84 of some relatively hard dielectric material that covers the leads 78 from the various connector pin terminals. Fixed to the opposite ends of the backing board as by adhesive bonding and rivets are a pair of metal impact plates 86 that are positioned directly over the terminal ends of the phase and neutral pin connectors and have sufficient strength and hardness to recieve the repetitive blows of a driving hammer 88.

THE DRIVE SYSTEM

The system for imparting continuous or repetitive driving energy to the impact plates of the support board, and hence indirectly to the probe elements of a receptacle base unit, may best be described with reference to FIGS. 4A and 5. The motor 43 which may be of any suitable type such as a universal AC - DC motor of around one-fifth to one-third H.P. is positioned vertically with its output shaft (not shown) connected to one gear 90 of a standard reduction gear train (e.g., 50:1). A final driven gear 92 of this train is positioned within the gear box directly above the drive support tube assembly 36 and is fixed to a shaft 94. This shaft extends downwardly from the gear box through a bushing 96 that is held by one set of screws 98 to the upper end of the drive tube housing 36 and by another set of screws 102 to the gear box 44. At its lower end this latter housing extends through a mounting collar 104 and inside an opening in the upper housing portion 34 formed by a circular flange 106 thereon (See FIG. 5). The collar is secured to the upper edge of the flange by a series of machine screws 108 and on its underside is an annular recess for a retaining ring 110. The latter is a flat annular ring with a diameter less than that of the drive tube housing 36, and therefore its inner portion seats within a circular groove in the drive tube housing to hold it axially in place.

Fixed to the lower end of the shaft 94 is a circular member 112 having a larger diameter that is fixed to and serves as a cap for the upper end of an elongated drive tube 114 extending downwardly almost the full length of its housing 100. At its lower end the drive tube is supported by a bearing 116 mounted on the inside of the housing. Attached to the inner wall of the drive tube by a plurality of radially extending pins 118 is a cam 120 having a helical surface 122 that provides a lifting force to a follower 124 for each revolution. The ends of the helical cam surface are connected by a vertical surface 126 that allows the follower to return to the lower end of the cam. The follower is a cylindrical rod extending transversely through a reciprocating hammer shaft 128 and it is held in position by a retaining pin 130. This hammer shaft is supported at its lower end by an annular flanged fitting 132 having a bearing 134. Just above the follower 124, the shaft 128 is supported by another bearing 136 fixed to the inside of the rotating drive tube. The upper end of the hammer shaft is spaced downwardly from the cap 112 of the drive tube 114 and has circular member 138 with a central opening within which is a slidable spring guide 140. This guide has a mushroom-like shape with an enlarged circular upper end 142 that bears upwardly against a thrust bearing 144 mounted in the cap 112 of the drive tube.

A shaft portion of the spring-guide extends downwardly into the hammer shaft and near its lower end is a cross pin 146 sized to slide within a pair of axial slots 148 in the opposite walls of the hammer shaft. Around the shaft portion of the guide 140 and retained between the upper end 138 of the hammer shaft and the lower surface of the spring guide head 142 is a spring means. This could be a simple coil spring, but we have found that more ideal characteristics are obtained by a series of disked washers or rings 150, commonly referred to as belleville washers or disc spring washers. These washers are installed with the curvature of adjacent ones in the opposite direction so that only their inner and outer edges are in contact when no compressive force is being exerted on them. These spring washers provide the downward driving force for the hammer shaft so they must be capable of storing energy efficiently and also of retaining this capability over long periods of use. We have found that around 34 of the washers 150 made of steel material and having a diameter of around 1.3 to 1.5 inches provide the required amount of spring force. The exact number and size of washers 150 can vary depending on the amount of energy needed by the hammer.

Fixed to the lower end of the hammer shaft by a plurality of machine screws is the hammer 88 which is formed from a hard durable metal. For the receptacle base member having four probe elements 48, as shown in FIGS. 4A and 5, the hammer has a body with a generally rectangular shape and four rectangularly spaced apart and downwardly projecting portions at its corners. These corner portions re vertically aligned to strike the impact plates 86 of the support board 56 directly above the probe elements 48 of an attached receptacle base unit 46.

As shown in FIG. 4A, a power cutoff switch 152 is fixed to the inside wall of the upper housing portion. As the hammer moves to its "up" position, this switch is engaged and actuated by a cam 154 fixed to the hammer body. The purpose of this switch is to assure that at the end of a receptacle installation cycle the machine will not cease its operation with the hammer in a down position which would later make it difficult to attach another receptacle base unit 46.

Thus, in operation, the drive motor 43 rotates the spur gear 92 through the gear train and thereby rotates the drive tube 114 and its cam 120 at the predetermined speed. As each revolution of the drive tube occurs the follower 124 rides up the helical cam surface 122, thereby pushing the hammer shaft 128 upwardly against the spring force of the belleville washers 150. When the follower reaches the end of the helical cam surface it is released from the cam force and drops straight down along the vertical surface 126 as the drive tube continues to turn. When released, the stored energy of the spring washers is applied to the hammer, as a driving force to the probe elements. The action of the hammer continues until it is cutoff by stopping the drive motor. This motor cutoff is accomplished automatically by the control system contained in the box 38 when the probe elements have penetrated into the laminated structure and have made a proper electrical contact with its internal conductive layers.

THE ROTARY SUPPORT

As mentioned previously the machine 20 is constructed so that it can be placed at any location on a floor and then rotated to scan the floor to detect any breaks or joints in the laminated floor structure beneath the machine and normally hidden under a floor covering. The rotation and scanning procedure is accomplished before an operator steps upon the machine just prior to the driving sequence of operations. To make this scanning rotation possible, the lower end of the machine is provided with a bottom cover 160 which is fastened to a series of inwardly projecting boss portions 162 at the inside corners of the lower housing 32, as shown in FIGS. 6, 9 and 10. Each boss portion has a cylindrical recess 164, as shown in FIG. 10, with a tapped bore 166 at its upper end within which is threaded a machine screw 168 that extends through a corner of the cover. Surrounding each screw is a spacer sleeve 170 and a coil spring 172 that extends between the upper end of the recess and the cover. A protective rubber member 174 is preferably attached to the lower edge of the lower housing member 32. With no operator load on the machine, a clearance is provided between the cover and the boss portion which keeps the edge 174 of the housing from engaging the floor surface. However, when weight is applied to the housing, it is pressed downwardly against the force of the springs 172 so that the rubber edge engages the floor surface.

The bottom cover 160 is preferably made from a piece of sheet metal which may be stiffened on its upper side by a series of angle members 176 connected at their ends in a rectangular configuration. Centrally located on the cover is a circular opening 178 and fixed to the edge of this opening by a series of angle brackets 180 and screws 182 is the upper race 184 of an annular bearing housing. Essentially, this upper race forms a circular groove for a series of ball bearings 186 that roll on a circular lower race member 188 forming the bottom portion of the bearing housing. This lower race has an outer lip portion 190 (FIG. 6) that curves upwardly and over the edge of the upper race to hold the two races together while allowing relative rotary movement between them. The lower race member has a bottom surface that contacts the floor surface and a central opening 192 with a substantially rectangular shape within which a receptacle base unit 46 attached to a contact board 56 is located during an installation operation. Thus, when the machine rests on the floor prior to a driving operation, only the lower race member 188 engages the floor surface with the edges 174 of the housing being held slightly above it. In this position the upper race 184 riding on the ball bearings 186 and thus the entire machine housing 32, is free to rotate to accomplish the scanning procedure for the machine.

THE SENSOR

As shown in FIGS. 6 and 9, a sensor 194 is attached to the inside of the lower housing 32 at one of the ends thereof. This sensor is preferably of a type utilizing an open ended core transformer for detecting magnetic metals in the presence of non-conductive materials or magnetic metals in the presence of non-magnetic conductors by changes in magnetic flux that occur as it is moved over the area being scanned. Such sensors are commercially available and therefore will not be described herein. For example, a sensor manufactured by Electro Corporation of Florida has proven to be satisfactory with our machine. The sensor is mounted within a cylindrical housing 196 that is retained by a machine screw 198 to the main housing 32. Within the housing the sensor is engaged by a coil spring 200 that constantly urges it downwardly so that it will always be close to the floor surface during the scanning procedure. Now, as seen in FIG. 1, when the machine is rotated about its central axis, the sensor will sweep through a circular path (e.g., paths 30a and 30b) around the receptacle base unit to be installed so that the proximity of any non-magnetic metallic passages 28 between panel sections can be readily detected.

THE LOCKING LATCH

The machine is provided with a locking latch 202 to prevent rotation of the housing and a release button 204 for this latch which is actuated just prior to a scanning procedure. As shown in FIGS. 6, 7 and 9, the handle is connected to one end of the latch which is mounted on a pivot pin 206 and biased by a spring 208 to its closed position. The pivot pin and spring are supported on a bracket 210 fixed to the upper side of the bottom cover 160 and thus they move with the main housing. Fixed by another bracket 212 to the lower race member 188 is a cam member 214 having a sloping edge in the path of the latch 202 and a slot 216 along this edge. Thus, as shown in FIG. 7, a downward force on the rotation release button 204 will lift the latch 202 out of the slot 216 where it is normally held by the spring 208 during a driving sequence. This allows the main housing 32 to be rotated relative to the lower race member 188, as previously described.

Also attached to the bracket 212 is an arm 218 having a rear vertical flange 220 and an inwardly bent forward portion 222. The initial rotation of the main housing upon unlocking of the latch can take place only in the clockwise direction (as shown in FIG. 9) because in the latched condition, the rear flange 220 is bearing against a first or "end-scan" switch 224. Now, as the main housing is unlatched and moves clockwise relative to the stationary lower race member, it travels almost 360° until the rear flange 220 is engaged by a stop member 226 fixed to the cover member 160. Just prior to this engagement with the stop member, the forward arm portion 222 engages the actuating lever of a second or start-scan switch 228. The function of these two switches 224 and 228 with regard to the scanning operation of the machine will be explained below.

THE ELECTRONIC SCANNING AND CONTROL SYSTEM

FIG. 11 is a block diagram showing the operative relationship of the elements of our machine which comprises the system for controlling the starting and stopping of a driving operation. This system prevents the machine 20 from driving unless a favorable response is received from the sensor 194 during its scanning sequence and it also automatically stops the machine when the probe elements 48 and the ground bands 71 of a receptacle base unit 46 have been driven into proper contact with the internal and external conductive layers of a laminated structure 22. Essentially, this system comprises a start-up, lock-out, sensor logic circuit 230 which must receive proper signals from the sensor head, the start and end scan switches 228 and 224 and from a motor control logic circuit 232 before enabling the driving cycle. Connected to the sensor head is a single oscillator 234 with open sensor detector capability which, combined with the sensor head, generates a logic "1" signal when a panel unit (e.g., steel) is present below the sensor and a logic "0" when no panel structure is present, or when a non-magnetic, non-steel, tie-down strip covering spaces 28 between panel sections is present.

A motor control card 236 has an output connected to the motor 43 and is essentially a circuit that controls the 115 AC voltage to the motor on the basis of logic signals received from the logic motor control.

A pair of sense receptacle oscillators 238 and 240 are provided which are duplicate circuits electrically isolated from each other and to the remainder of the circuits by transformers. This isolation is required because of the possibility of 115 volts AC power being applied to a panel during a receptacle base insertion which would be applied across components of the machine electronics and possibly damage some of the circuits.

Each oscillator functions whenever its two connected probe elements are shorted together as they engage an internal conductive layer. A neutral-phase control memory circuit 242 having "D" flip-flop integrated circuits receives and stores signals from the sense receptacle oscillators. When both oscillator outputs have been received, the outputs will be anded and a signal provided to a delay circuit 244.

A sense receptacle ground circuit 246 develops an output signal to the memory circuit 242 when the ground bands 71 of the receptacle base unit make contact with the top ground layer of a panel unit. This is made possbile by having the machine electronics power supply ground common with the panel unit ground. When the receptacle base unit ground bands are grounded, a logic "0" is developed which enables the memory circuit to accept other inputs. The main logic circuit 230 and the logic motor control 232 both utilize dual and quad input nand gates combined in set-reset type logic circuitry which will be described fully with respect to FIGS. 12A, 12B, 12C. The delay circuit generates a logic "0" motor shut down signal to the logic motor control 232 after an adjustable delay time so that an additional measured number of hammer blows on the receptacle base unit will be made after the initial probe element contacts with their respective conductive layers to assure even better and more durable contacts. The start-scan switch 228 is connected to the start-up lock-out sensor logic circuit 230 while the end-scan switch 224 is connected to the logic motor control circuit 232 together with an operator start button 248. A lamp driver circuit 250 including an indicator lamp is connected to the logic motor control circuit and is connected to turn "on" before the machine starts its driving action and after the receptacle base unit has been properly installed in the laminated floor structure.

Figure 12A:
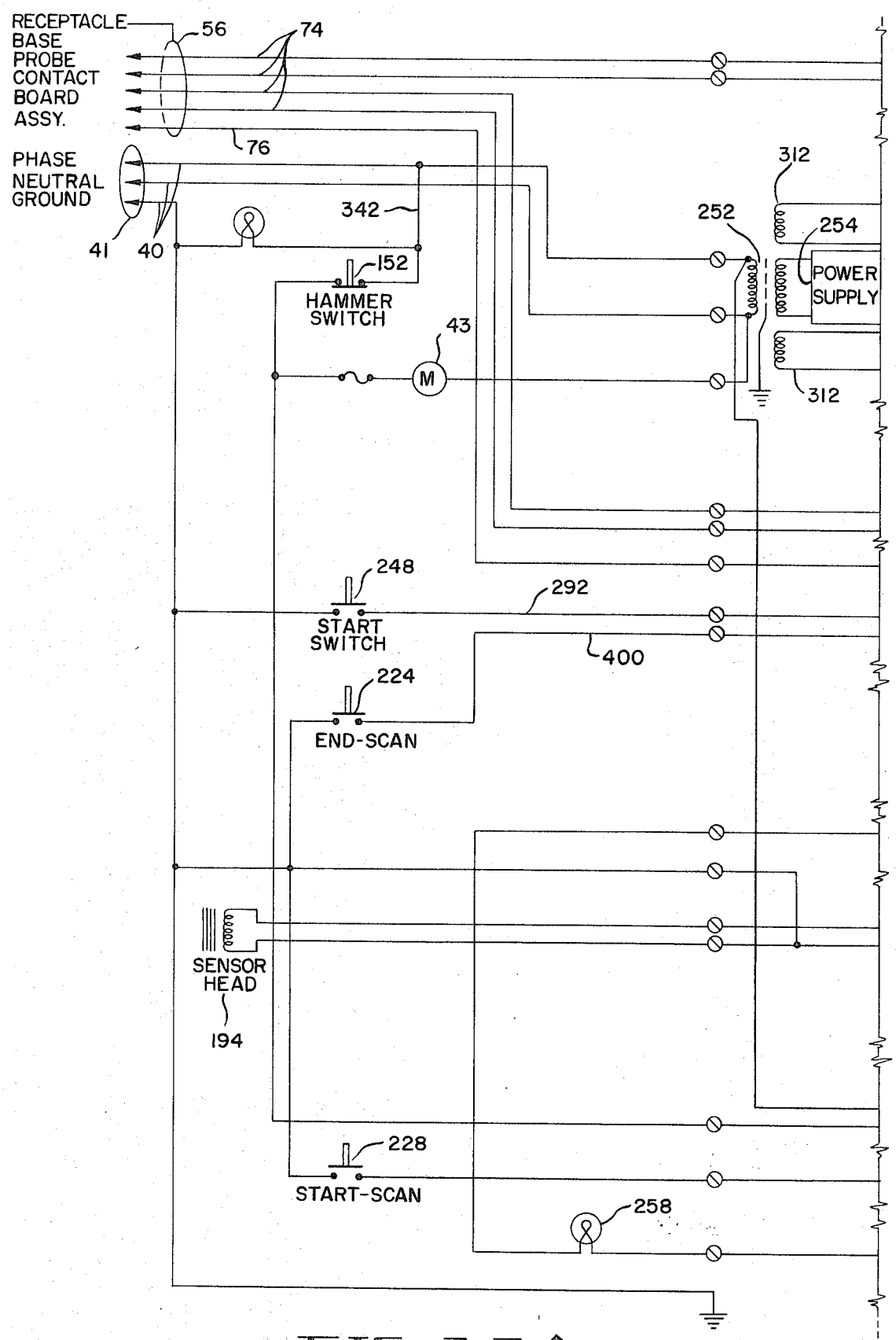

A more detailed description of the start-up and control system operation will now be described with reference to FIGS. 12A, B and C.

When the machine 20 is on the floor after being loaded with a base unit 46 having its probe elements 48 ready for installation in a laminated floor structre, its power plug 41 is inserted into a suitable 115 VAC 60 cycle receptacle having a ground terminal connected to a building electrical ground. This supplies AC power to a multi-tap transformer 252 whose central winding is connected to a conventional DC power supply unit 254. This power supply unit is connected through a lead 256 to an indicator lamp 258 of the lamp driver circuit 250 and also through a lead 260 having a pair of resistors 262 and 264 to a four input nand gate 266 of the logic circuit 230. Because of the slow charge of a capacitor 268 in series with the resistor 264 and connected to ground, the current flow to this nand gate lasts for about one-fourth second, long enough to set the output of gate 266 to a logic "1" value. Once the capacitor is charged to a logic "1," it no longer influences the logic circuit. The output of gate 266 is applied to a connected nand gate 270 which is also receiving a logic "1" input from the lead 260 through a resistor 272. Thus, a logic "0" output is produced by gate 270 which is supplied to and latches gate 266. Now, the output of gate 270 is supplied to an inverter 274 of the lamp driver circuit 250 whose logic "1" output is supplied to the base of the first of two transistors 276 and 278 in the driver circuit. The first transistor also receives power through a resistor 280 connected to the lead 260, thereby supplying current to the base of the second transistor whose collector is connected through a resistor 282 to the indicator lamp 258. Since the emitter of the second transistor is connected to ground the circuit is complete and the lamp is turned on. The logic "0" output from the latched gate 270 is also supplied to a four input nand gate 284 of the logic motor control circuit 232 causing it to produce a logic "1" output which is supplied via a lead 286 to the motor control card 236. This card or circuit controls the flow of 115 VAC power to the drive motor 43 and is commercially available (e.g., Electro motor control card, model 76050). Thus, at this point, the output "1" signal from gate 284 inhibits the AC power to the motor. The output of gate 284 is also supplied to a nand gate 288 of the logic control circuit 230 which enables it to accept information from the sensor 194 via gate 310 and lead 312 at the other input to this gate. The gate 284 output is also supplied to a nand gate 290 having another input connected by a lead 292 to the operator's start switch 248. With this switch initially open, the combined inputs to gate 290 produce a logic "0" output which is supplied to and therefore latches gate 284 to a logic "1" output.

Now, the rotating assembly of the machine is unlocked by pushing the rod 204 to disengage the latch 202. This unlocking closes the end scan switch 224 and applies a ground (logic "0") signal through a lead 400 to gate 284, thereby maintaining a logic "1" output that inhibits the driving motor 43 until the scanning procedure is complete and the machine rotating assembly is back in the locked position.

The machine is now rotated clockwise relative to the bottom plate 188 which remains stationary on the floor surface, and the sensor 194 sweeps through a circular path, as designated by the numerals 30a and 30b in FIG. 1.

As the machine completes its initial rotation it closes the start-scan switch 228 which provides a ground signal through the motor control card 236 and a lead 294 connected to the gate 270. This produces a logic "1" output on gate 270 which is supplied by a lead 296 to gate 266. At this point, the input to gate 266 in a lead 298 from the gate 288 is a logic "1" as long as the sensor 194 is over steel. Also, the input in a lead 300 from the delay circuit 244 is a logic "1" since the probe elements of the base unit being driven are not at there ultimate depth and the input in a lead 302 is a logic "1" since it is connected to lead 260 from the power supply 254. Now, since all inputs to the gate 266 are logic "1," it produces a logic "0" output which is supplied to gate 270 causing it to latch with a logic "1" output. This output through a lead 304 produces a logic "0" output on gate 274 which shuts off the indicator lamp 258. The logic "1" output of gate 270 is also supplied via a lead 306 to gate 284, thereby preenabling this gate for the end-of-scan function.

Now, the machine is rotated counterclockwise 360° toward its locked position. As the end of this latter scanning rotation occurs, the latch 202 rides up on the cam and drops into its slot to relock the machine at its original position. If the sensor 194 did not detect any undesirable material during its scan, that is, if only steel was under the sensor instead of an aluminum or nonferrous divider strip on the laminated floor structure, the sensor output through the sensor card 234 via a lead 308 to a gate 310 of the logic circuit is a logic "1." Thus, the output of gate 310 is a logic "0" and is supplied by a lead 312 to the gate 288. Since this latter gate is receiving a logic "1" from gate 284 its output becomes a logic "1" and is supplied via the lead 298 to gate 266, as previously mentioned. To summarize, at this point all inputs to the gate 266 are at logic "1" which latches the gate 270 output to a logic "1," thereby keeping the lamp 258 deactivated. The motor is kept deactivated by the end of scan switch 224 which provides a logic "0" in lead 400 at gate 284 until the locked position is reached at the end of the scan rotation. When the locked position is reached, the end of scan switch 224 is opened and the logic "0" (ground) is lost in lead 400 at gate 284, thereby pre-enabling this gate at a logic "1," waiting for the operator to push the start switch 248.

If, during the scan rotation a lack of steel appears under the sensor as it passes over a non-ferrous divider strip or some other area not having a laminated floor structure, then the signal in lead 308 from the sensor card 234 becomes a logic "0." This causes gate 310 to provide a logic "1" output to gate 288 which is also receiving a "1" from gate 284 causing it to produce a logic "0" output. This signal applied to gate 266 causes its output to become a logic "1" and resets the latch which results in a logic "0" output on gate 270. This output supplied to gate 284 causes its output to remain at a logic "1" which permanently disables the motor 43. It also causes the output of gate 274 to become a logic "1" which acts through the drive circuit 250 to turn on the indicator light 258.

The neutral and phase connector pins 74 on the receptacle base probe contact board 56 are connected to the neutral and phase oscillator circuits 238 and 240 respectively, both of which are connected to the memory circuit. Thus, as shown in FIGS. 12A and 12B two connector pins for the neutral probe elements are connected to the oscillator circuit 238, two connector pins for the phase probe elements are connected to the other oscillator circuit 240, while a ground probe connector pin 76 from the contact board is connected to the sensor receptacle ground circuit 246 via lead 326. Each oscillator is a conventional unijunction circuit powered from separate windings 312 of the main power transformer via bridge rectifiers 314 which furnish direct current through pairs of resistors in series to transistors 316. The two leads from the phase or neutral connector pins are also connected to the plus lead from the rectifier and the transistor to complete a circuit. When either the "neutral" probe elements or the "phase" probe elements contact a conductive layer of a laminated structure a circuit is completed and the respective oscillator is activated. When this occurs, a pulsing current flows from the transistor of the oscillator circuit to an isolation transformer 318 and from it to the neutral-phase control memory circuit 242. This latter circuit comprises a pair of "D" flip-flop integrated circuits 320 and 322. A logic "1" applied to the R input of each flip-flop indicates that the ground bands of the base unit being installed have not made contact with the top ground layer of a panel structure. At this point, no other signal information will be accepted. When a logic "0" is applied to the R input, the pulses from the oscillators can be received and stored. When both oscillator outputs have been received they will be "anded" by a pair of transistors Q1 and Q2 of the memory circuit 242.

Before a receptacle base unit is installed by the machine there are no ground, phase or neutral connections of the various probe elements with those layers of the laminated floor structure, and thus the transistors 316 (Q5 and Q6) of the two oscillator circuits are inoperative. At this stage, the base of a transistor Q3 in the sense receptacle ground circuit 246 is connected to a lead 326 from the ground connector on the contact board 56 which, at this point is open-circuited to ground. The collector of Q3 is driven to "0" by the "1" on the base through resistor 401. Also connected to Q3 collector lead are the two inputs of nand gate 328 which thereby provides a logic "1" output via a lead 330 to the two flip-flops 320 and 322, thereby resetting and locking out their "D" sections. This causes a logic "0" output at both of the (Q) pins of these flipflops. These outputs are base connected to a pair of transistors Q1 and Q2 respectively, thereby causing a logic "1" at the collector terminal of Q1 and Q2 respectively, thereby causing a logic "1" at the collector terminal of Q1 which in turn supplies a logic "1" to the two inputs of a nand gate 332 in the delay circuit 244 for motor shutoff. The output of gate 332 is a logic "0" which is supplied to another nand gate 334 whose other input of a logic "0" is received from a delay one shot 336. The output of gate 334 is therefore a logic "1" which is connected to the gates 284 and 266 of the logic circuit 230, as discussed above. The inputs to the delay one-shot 336 which are logic "1" from the transistor Q1, and the logic "0" from the ground input result in a logic "0" output to the gate 334.

To start the installation driving power after the scanning has established a ready condition, the operator steps on the machine housing 32 with his feet positioned by the studs 338 and presses the start switch 248. This causes a logic "0" to occur through lead 292 at gate 290 which causes its output to be a logic "1" as supplied to gate 284. This in turn causes the output of gate 284 to be a logic "0" which is supplied by the lead 286 to the motor control card 236, and the motor starts to reciprocate the hammer.

The logic "0" output of gate 284 is also supplied to gate 288 which maintains a logic "1" output supplied by lead 298 back to gate 266 thereby locking out any changes in sensor logic information on its outer input lead if, for example, the tool should momentarily bounce up and down as it starts its driving operation.

When both phase probe elements 48 make contact with the neutral layer (the uppermost internal conductive layer of a laminated floor structure) and both neutral probes make contact with a top ground layer, the oscillator transistors Q5 and Q6 deliver pulses to their respective isolation transformers 318 and to their detector circuits. Thus, a logic "1" amplitude pulse is repeatedly applied to the flip-flops 320 and 322. However, the outputs of these flip-flops are unaffected at this point due to the logic "1" signals present on inputs from gate 328 of the sense receptacle ground circuit 246. Thus, the machine continues to drive further until contact is lost on the phase and neutral pairs and the oscillators Q5 and Q6 are de-energized.

The machine will continue to hammer on a receptacle base unit 46 until all three of the following conditions have been met: First, the base of transistor Q3 in the sense receptacle ground circuit must be connected to a ground layer of the laminated floor structure through the receptacle base ground contact via lead 326. This causes the collector of transistor Q3 to become a logic "1" which is supplied via lead 332 to the delay one shot 336 of the delay motor shutoff circuit 244 and also to the inputs of the nand gate 328. This latter gate thus provides a logic "0" output which is supplied to the "D" flip-flops 320 and 322. This enables both of these flip-flops to act on any logic information from the phase and neutral oscillator-detector circuits. The logic "1" to the flip-flop 336 in the delay shutoff circuit enables the delay one-shot to receive information and activate on reception of a logic "0" signal from the collector of transistor Q1.

The second condition for shutoff occurs when the phase contact probe elements make continuity to the phase layers of the laminated floor structure and the oscillator transistor Q-6 is therefore energized. This produces a logic "1" amplitude pulse at the Q output on the flip-flop 320 which turns on the transistor Q2. The third condition for motor shutoff occurs when the neutral probe elements of a receptacle base unit make contact with the neutral layer of the laminated floor structure and oscillator Q-5 is therefore energized to produce a logic "1" amplitude level at the Q output of the flip-flop 322 which is supplied to and turns on transistor Q1. With both transistors Q1 and Q2 turned on a logic "0" is supplied to two pins Q1 and Q2 turned on a logic "0" is supplied to two pins of the delay one-shot 336 of the shutoff delay circuit. This logic "0" signal is also supplied to the nand gate 332 which in turn supplies a logic "1" to the gate 334. The delay one-shot 336 is activated for a time that is determined by the value of capacitor 403 and the set of a variable resistor 340 which are connected between the positive supply lead 402 and the one-shot 336. Transistor Q4 whose emitter is also connected to the one shot, amplifies the time-delay of capacitor 403 and resistor 340. At the end of the delay pulse produced by the one-shot, the desired delay amplitude at its output pin rises from a logic "0" to a logic "1" on lead 404 to the input of gate 334. This produces a logic "0" on the output of the gate 334 which is supplied to gate 284 and to gate 266. This produces a logic "1" at the output of gate 284 which is supplied to the motor control card 236. Now, insofar as the logic control circuit is concerned the motor is turned off, but it remains on until the hammer switch 152 which is supplying current from the phase lead through a lead 342 to the motor is opened when the hammer is in its fully "up" position. The logic "0" provided to gate 266 from gate 334 produces a logic "1" output on gate 266 which causes gate 270 to produce a logic "0" output that is supplied to gate 274 thereby producing a logic "1" that turns on the indicator lamp 258 as previously described.

Once the motor has been turned off as described, following the completion of a receptacle base installation, it will not start again until a new search scan cycle has been accomplished.

With the receptacle base unit 46 installed with each of its probe elements 48 in proper contact with the phase and neutral layers of the laminated floor structure and the unit itself in contact with a ground layer, the machine 20 may be easily disengaged from the base unit by lateral movement of the locking handle 70. Now, a new receptacle base unit can be attached and installed by the machine 20 at some other preselected location on the laminated floor structure.

If desired, a modified form of our machine may be used without the built-in self-sensing feature for determining the location of non-magnetic materials below the carpet/tile covering. FIG. 13 is a block diagram similar to FIG. 11 showing the operative relationship of the control elements of our machine when modified to eliminate the self-sensing feature. Such a modification may be desirable when installing large numbers of receptacles into areas known to be far from the panel periphery.

This modification eliminates the sensor head, start-scan and end-scan switches, the single oscillator and open-sensor detector, and the machine rotating assembly. With regard to the latter, the bottom cover 160 (FIGS. 14 and 15) having the rotary support is merely replaced by a modified cover 160a of a suitable sheet material (either metal or plastic) which is connected at its corners to the machine housing by the screws 168. This modified cover is thus fixed in position above the lower edge 174 of the housing so that the machine rests in a stationary position directly on the floor surface when in operation. A central rectangular shaped opening in the cover is large enough to allow the contact board 56 and an attached base member to pass through it.

In order to prevent possible accidental startup of the machine when the power cable has been connected to a 115 VAC source, two foot activated switches 410 are provided. These switches are preferably located between each group of heel positioning studs 338 on the machine housing 32 so as to be activated when the operator is standing normally on the tool. The switches are wired in series with the tool start switch 248 within the housing so that it is impossible to begin base insertion unless the operator is in correct position on the tool. This minimizes the possibility of the tool driving at base without an operator aboard.

From the foregoing it is seen that the present invention provides a machine for forcing probe elements into a laminated floor structure that is easy to operate and completely automatic in its shutoff after the probe elements have made contact with the proper conductive layers of the laminated structure. Thus, the installation of a large number of receptacle base units can be accomplished rapidly with efficiency and safety by relatively unskilled personnel.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A machine for installing a receptacle unit or a similar connecting device with probe elements into a laminated floor structure having internal conductive layers, said machine comprising:

means for holding said unit so that its probe elements are positioned for being driven into the floor structure;

drive means for applying a downward force to the probe elements of the unit;

and control means for discontinuing said downward force when the probe elements have penetrated into the laminated structure a predetermined depth.

2. The machine as described in claim 1 wherein said holding means comprises a board, a series of connector pins mounted on and extending downwardly from said board and adapted to contact said probe elements, electrical lead means on said board extending from said connector pins and connected to cable means extending to said central means, and retaining means for engaging said receptacle unit and holding it adjacent to said board.

3. The machine as described in claim 2 wherein said retaining means comprises a pair of rotatable rods which extend through said board and have enlarged end portions for engaging a said receptacle unit, and movable linkage means connected to said rods for moving them and their end portions into a locking position on said receptacle unit.

4. The machine as described in claim 2 wherein said board is made of a non-conductive material and is shaped so that it extends over the ends of all of the probe elements of a receptacle unit, and relatively hard impact plates on the upper surface of said board above its said connector pins adapted to contact the probe elements.

5. The machine as described in claim 1 wherein said driving means comprises a reciprocating hammer providing repetitive impact force to said probe elements.

6. The machine as described in claim 5 wherein said hammer is connected to a shaft, said driving means further comprising spring means axially aligned with said shaft means for moving said shaft against said spring means and then releasing it to cause axial movement of the shaft and said hammer.

7. The machine as described in claim 6 wherein said means for moving said hammer shaft comprises a motor connected through a gear train having an output shaft, a drive tube fixed to said output shaft and a helical cam fixed to said drive tube, said hammer shaft having a follower for engaging said helical cam, whereby rotation of said drive tube and said cam causes axial movement of said hammer shaft against said spring means.

8. The machine as described in claim 6 wherein said spring means comprises a series of disked washers stacked so that only their edges are in contact when no axial force is applied to them.

9. The machine as described in claim 8 including a mushroom shaped spring guide extending through the center of said disked washers and having a lost motion connection with said hammer shaft.

10. The machine as described in claim 1 wherein said control means includes means for automatically stopping said driving means when the probe elements of the receptacle unit have made an electrical contact with the internal conductive layers of the laminated structure.

11. The machine as described in claim 5 wherein said control means includes means for stopping said driving means only when said hammer is in an "up" position.

12. A machine for inserting a plurality of probe elements attached to a receptacle base unit into a laminated floor structure having internal, spaced apart conductive layers, said machine comprising:
a housing;
means within said housing for holding said receptacle base unit with its probe elements positioned above the floor structure;
hammer means positioned in alignment with the upper end of said probe elements;
a motor means;
drive means connected to said motor means for providing a reciprocating force to said hammer means sufficient to drive said probe elements downwardly into said laminated floor structure;
and automatic control means for stopping said drive means when said probe elements have inserted to a predetermined depth within said laminated floor structure.

13. The machine as described in claim 12 including a base member rotatably attached to the bottom of said housing and adapted to rest on the surface of said laminated floor structure or a covering thereon, and sensor means mounted in said housing, whereby said housing and said sensor means can be rotated to scan an area under said housing while said base member remains stationary prior to actuation of said drive means.

14. The machine as described in claim 13 wherein said base member comprises the lower race of an annular bearing having an upper race, and a bottom plate member fixed to said upper race and attached to said housing and being yieldable in such a manner that without any extraneous weight on the housing its lower edge will be supported above said base member and will not engage the floor surface, thereby allowing the housing to be rotated, but with added weight on the housing such as an operator its lower edge will engage the floor and remain stationary.

15. The machine as described in claim 14 wherein said bottom plate is attached to said housing by fasteners that retain yieldable spring members when tending to hold the housing upwardly from the bottom plate.

16. The machine as described in claim 13 including means for locking said base member relative to said bottom plate after scanning has been accomplished, and release means connected to said locking means.

17. The machine as described in claim 16 wherein said locking means comprises a cam having a slot fixed to said base member, and pivotal latch means fixed to said bottom plate aligned to engage said cam and fit in said slot, said latch means being connected to said release means extending outside of said housing.

18. The machine as described in claim 12 wherein said housing includes an upwardly extending drive support tube assembly including said motor means and said drive means, and a separate enclosure for said control means fixed to said tube assembly.

19. The machine as described in claim 12 wherein said housing includes a lower portion with flat, horizontal surfaces for supporting an operator and guide means extending from said surface for indicating the operator's proper position.

20. The machine as described in claim 13 wherein said control means includes an end-scan switch and a start-scan switch and logic circuit means responsive to signals from said switches and said sensor means for controlling the activation of said drive means.

21. The machine as described in claim 20 including indicator light means connected to said control means for indicating the ready state of said drive means.

22. The machine as described in claim 13 wherein said control means includes means for producing control signals when said probe elements contact internal conductive layers of said laminated floor structure, memory means for storing said control signals, and logic circuit means for providing a motor shut-off signal upon receipt of signals from said memory means indicating that the probe elements are in proper electrical contact with the internal conductive layers of the floor structure.

23. The machine as described in claim 22 including a delay circuit for postponing the shutoff of said motor circuit for a predetermined time increment after receipt of the normal shutoff signals to said logic circuit, thereby allowing said drive means to drive said probe elements further into the floor structure.

24. The machine as described in claim 23 wherein said delay circuit comprises a one-shot circuit having an adjustable pulse width extender and a logic gate means connected to said one-shot circuit for producing a cut-off signal to said motor means.

25. A machine for inserting a plurality of probe elements attached to a receptacle base unit into a laminated floor structure having internal, spaced apart conductive layers, said machine comprising:
a housing:
means within said housing for holding said receptacle base unit with its probe elements positioned above the floor structure;
hammer means positioned in alignment with the upper end of said probe elements;
a motor means;
drive means connected to said motor means for providing a reciprocating force to said hammer means sufficient to drive said probe elements downwardly into said laminated floor structure;
switch means on said housing for preventing the actuation of said drive means until an operator is on said machine in the normal operating position;
and automatic control means for stopping said drive means when said probe elements have inserted to a predetermined depth within said laminated floor structure.

26. The machine as described in claim 25 wherein said switch means comprises a mechanical switch mounted on the upper side of said housing and adapted for engagement by the operator's foot when the machine is ready for driving.

27. The machine as described in claim 26 wherein said housing has a continuous sidewall with edge means that rests directly on a floor surface when in operation.

28. The machine as described in claim 25 wherein said switch means is connected to said automatic control means which includes logic circuit means for producing control signals when said probe elements contact internal conductive layers of said laminated floor structure and for providing a motor shut-off signal upon receipt of signals indicating that the probe elements are all in proper electrical contact with the conductive layers.

* * * * *